(12) United States Patent
Roseen

(10) Patent No.: US 6,919,795 B2
(45) Date of Patent: Jul. 19, 2005

(54) METHOD AND APPARATUS FOR KEEPING A CHECK ON THE STORAGE TIME FOR GOODS IN A STORAGE

(76) Inventor: Rutger Roseen, Oxenstiernsgatan 23, S-115 27 Stockholm (SE)

( * ) Notice: Subject to any disclaimer, the term of this patent is extended or adjusted under 35 U.S.C. 154(b) by 73 days.

(21) Appl. No.: 10/344,937

(22) PCT Filed: Aug. 7, 2001

(86) PCT No.: PCT/SE01/01722

§ 371 (c)(1), (2), (4) Date: Feb. 19, 2003

(87) PCT Pub. No.: WO02/15073

PCT Pub. Date: Feb. 21, 2002

(65) Prior Publication Data

US 2003/0164754 A1 Sep. 4, 2003

(30) Foreign Application Priority Data

Aug. 18, 2000 (SE) .............................. 0002939

(51) Int. Cl.⁷ .............................................. G08B 1/00
(52) U.S. Cl. .............................. 340/309.16; 340/568.1; 340/570; 340/540; 62/125
(58) Field of Search ............................ 340/568.1, 570, 340/540, 309.16, 585, 586; 62/125, 127

(56) References Cited

U.S. PATENT DOCUMENTS 6,204,763 B1   3/2001  Sone ........................ 340/568.1

2002/0007486 A1 * 1/2002 Yun ............................. 725/26

FOREIGN PATENT DOCUMENTS

| EP | 1 030 521 | 8/2000 | |
|---|---|---|---|
| FR | 2785698 | 5/2000 | |
| JP | 405045041 A * | 2/1993 | .................. 62/125 |
| JP | 405045042 A * | 2/1993 | .................. 62/125 |
| JP | 8-49958 | 2/1996 | |
| JP | 10-9753 | 1/1998 | |
| WO | WO 9750045 | 12/1997 | |

* cited by examiner

Primary Examiner—Thomas J. Mullen, Jr.
Assistant Examiner—Sihong Huang
(74) Attorney, Agent, or Firm—Young & Thompson

(57) ABSTRACT

Method and an apparatus for registering and supervision of the positions and time of storage of articles entered into a cabinet or other delimited space. A preferred fields of application is refrigerators in which one or several cameras at selected occasions take pictures of the interior of the refrigerator. These pictures are treated in an image analyzer which transfers clear pictures of all articles stored on each shelf in the refrigerator to a computer for registration. In the computer there is stored for each article information on the time of entry in a list containing article denominations. For distance communication the computer can be connected to a central computer having information about all articles marketed on a national basis and including both pictures and denominations.

20 Claims, 3 Drawing Sheets

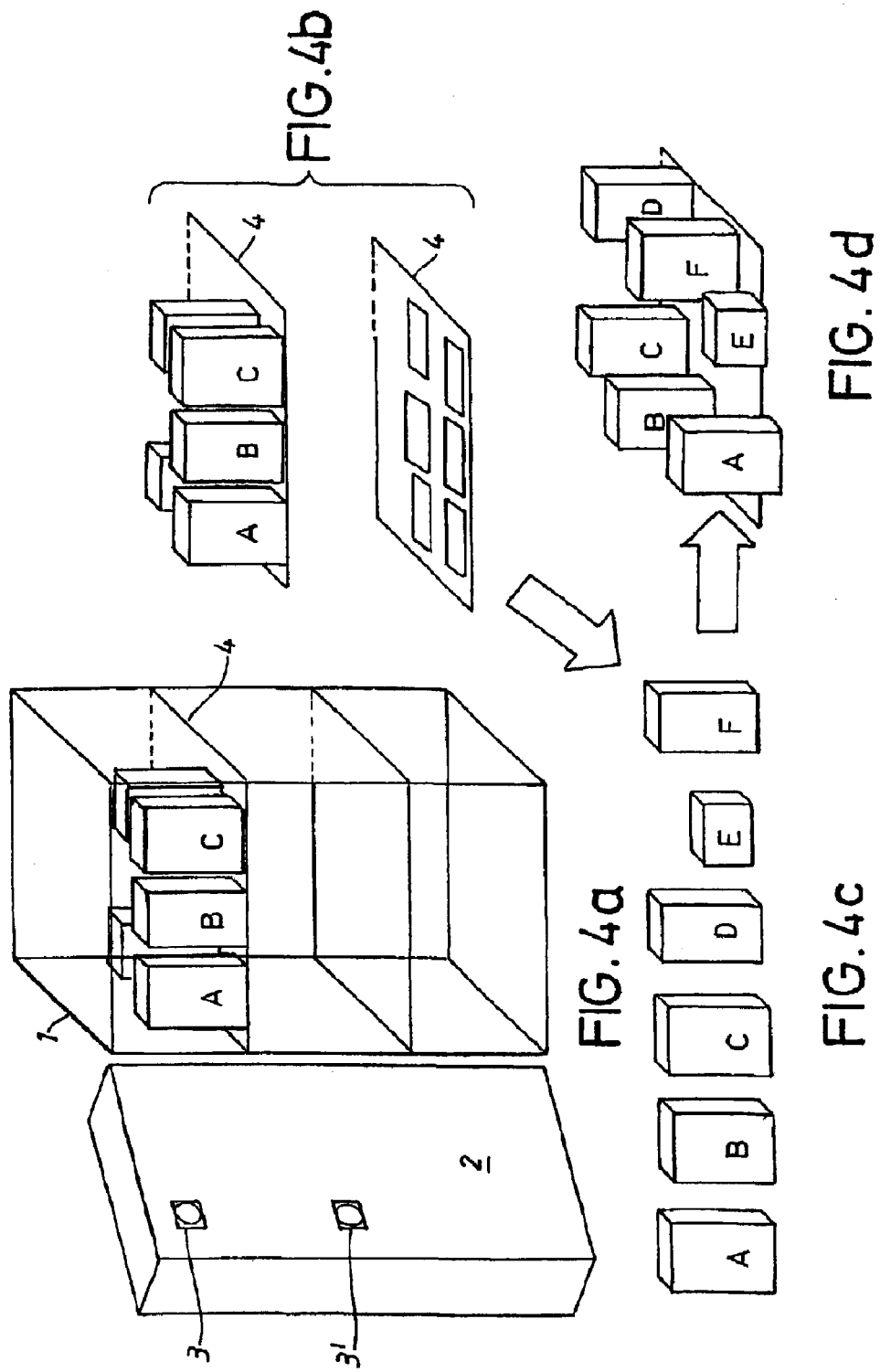

METHOD AND APPARATUS FOR KEEPING A CHECK ON THE STORAGE TIME FOR GOODS IN A STORAGE

BACKGROUND OF THE INVENTION

The present invention refers to a method for recording the position of goods stored in a cabinet or other space, in particular food-stuffs stored in a refrigerator, and for supervision of the storage time thereof. For carrying out the method an apparatus, suitable therefore, has been invented.

DESCRIPTION OF THE RELATED ART

In SE-A-9900582-9 a cabinet is described which includes one or several built-in cameras for taking pictures of the content of the cabinet and transferring the pictures to an image analyser. A number of pictures taken at different occasions are put together by the image analyser which by means of an associated computer makes lists of the content of the cabinet and, by means of a data program, of what to replenish. If the cabinet contains food-stuffs no information on the age thereof or on which food-stuffs have to be consumed first can be obtained by the known arrangement.

From practical use it has appeared that a refrigerator is loaded with food-stuff items to such degree that not even with the aid of the mirrors mentioned in the patent application referred to pictures are obtained by means of which all items will certainly be identified. Investigations have proved that in a household up to 10.000 articles can exist and surprisingly many of these are stored in a refrigerator. Equipment which offers a complete distance communication in terms of a mobile phone connection from a store to a home computer in order to obtain information on articles to shop, of course, also has to include a cabinet for groceries. Accordingly, an image analyser can be needed which has the capacity of a computer for identification of the 10.000 articles indicated. In itself, this is a question of dimension and of the number of cameras to be used. However, the problem remains to identify an article from fragmentary partial pictures only of said article or its package for recognizable illustration, for example through a picture or, alternatively, a denomination, transferred via Internet to a shop computer.

Another problem to which, hitherto, the prior art has not offered any solution is to automatically keep a check on the age of perishables, for example stored in a refrigerator, in other words the "best-before-date", actually the "usable-up-to-date". In the known arrangement, in which pictures are taken every time the refrigerator door is opened, or with a different selected frequency, one is reduced to using the conventional method. As known, this involves a "best-before-date" printed onto a food-stuff package or manually written thereon. In connection with home-made provisions or leftovers more frequently a making or packing date is noted on an adhesive label. In both cases it is required that the article be removed from the storage cabinet for reading of the date indicated thereon.

Inter alia fresh fruit and vegetables, offered for sale loose by the weight by self-service, do not naturally bear any indication of recommended time of consumption. In case of a desire of providing a refrigerator with an automatic warning device indicating the presence therein of eatables no longer fit for consumption one is reduced to the use of devices usually referred to as electronic noses. Such devices cannot sense smell in human meaning but detect the presence of putrefactive gases, such as methane, hydrogen sulfide and amines, and in the most developed forms also pheromones. However, these devices are disqualified for domestic use because they are too expensive. In addition, the effect thereof comes too late when putrefaction has already started. Also, the devices cannot single out a specific article for which the date of consumption has expired.

SUMMARY OF THE INVENTION

The object of the invention is to bridge the weaknesses associated with the present system as far as keeping a check on specific articles and the storage time thereof in a space are concerned. The apparatus invented for carrying out the new method is capable of identifying articles, recording the time of placement thereof in a storage space, such as a cabinet, and of indicating, in good time before the expiration of the time of consumption thereof, that the specific article should be consumed in the immediate future. In case of eatables the arrangement can also submit recipes in which the specific eatable, in the amount available, is contained.

The characteristic features required for carrying out the new method appears from the appending claims as do those for the invented apparatus.

For carrying out the method the apparatus includes the following components:

cameras, suitably with a picture size and in a number so as to cover every partial space of the room or cabinet to be supervised a local computer with a program for recognition of articles reproduced on pictures transferred by the cameras to an image analyser, the computer in a practical case, from a functional point of view, being split into separate units;

preferably, also communication means for connection with a central computer in which identities for all articles offered for sale on a national basis are recorded, said central computer in certain cases being adapted only to transfer the picture whereas the analysis is performed by the central computer.

The local computer, i.e. the computer provided adjacent the room which is supervised, the cabinet or cabinets can be connected to a keyboard and to a monitor or to a voice-controlled communication system. In certain cases a mobile phone or an Internet-connected equipment can be used. In a suitable place in the cabinet or room an area or a shelf is provided in which when introduced into the space articles can be placed for identification by means of a bar code reader or a RFID-reader or for recording of new articles by means of voice communication. This equipment is intended to be used in case neither the local computer nor the central computer, consulted via an Internet connection, can recognize an article. Such a case may occur if the article has been purchased during a trip abroad or if it has been imported. If the article is packed and provided with a bar code the central computer should be able to identify the article and if it fails the user has to enter the denomination of the article in the local computer by means of the keyboard or by means of the voice.

Alternatively, the article is given a running number and a denomination which both are recorded together with a picture of the article taken by a camera. The time of recording is stored. In case of an article with limited tenability the "best-before-date" is also recorded in the computer or taken from a register for the corresponding type of goods.

In case of RFID-marking a corresponding recording method has to be used.

The invention can be applied in connection with storage spaces of all kinds from wholesale dealer stores to household medicine cabinets. In the first-mentioned case the invention can serve as a means for maximum degree of packing as pallets with a specific article do not require a determined place in a stand but can be placed anywhere there is an empty compartment. Accordingly, the same type of articles can appear in several different places in the store; the computer keeps a check on where and on which pallet loads in the store are the oldest.

Another area of application can arise when shops in sparsely built-up areas shall serve also as a post office replacement. In most cases the additional business will be required to be housed in the space already provided. As far as the post packages are concerned they have to be stored in a very compact way from arrival to delivery. The possibility of using every square decimeter of the storage shelves provided will become even more a necessity with increasing e-shopping and mail-order business.

The major use of the invention, as counted in separate installations, is assumed to apply to private households, in particular relating to refrigerators and freezers, however not excluding refrigerating and freezing rooms in connection with professional kitchens.

Below, the method will be described in connection with the use of the apparatus for a domestic refrigerator. This shall be taken as an example only which should not be interpreted as a limitation of the inventive idea whatsoever.

BRIEF DESCRIPTION OF THE DRAWINGS

Reference is made to the appending drawing, in which.

DESCRIPTION OF THE PREFERRED EMBODIMENTS

Figure 1:
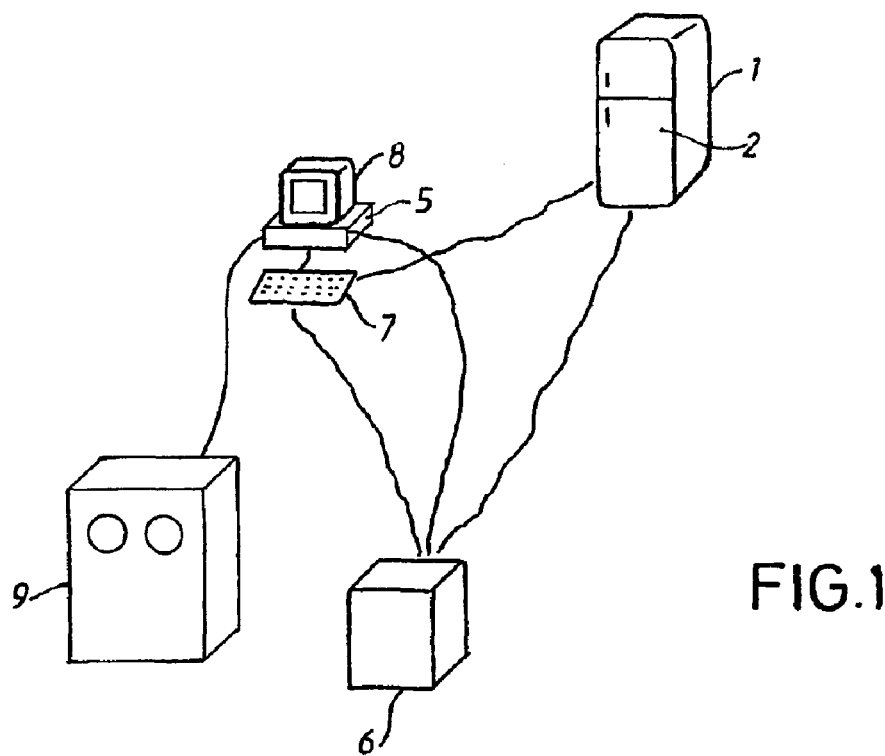
FIG. 1 illustrates the schematic component assembly of the apparatus.
Figure 2:
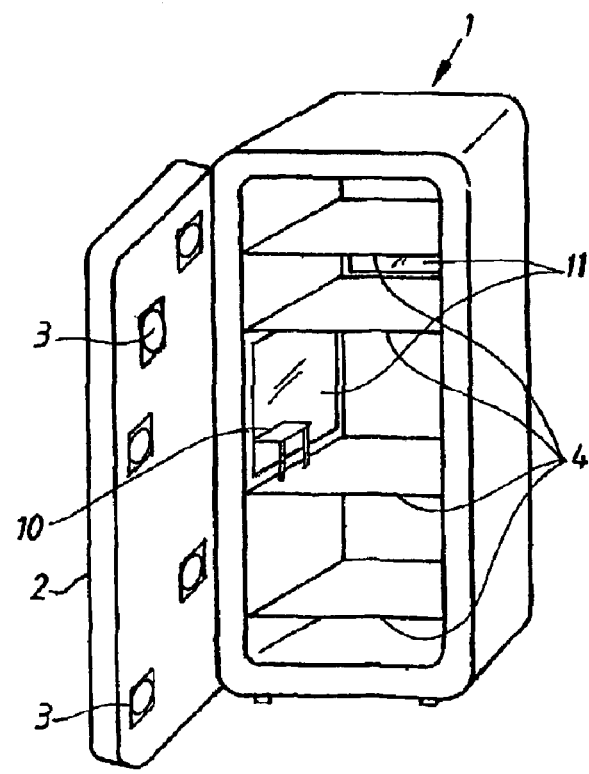
FIG. 2 shows a refrigerator equipped for carrying out the method.
Figure 3:
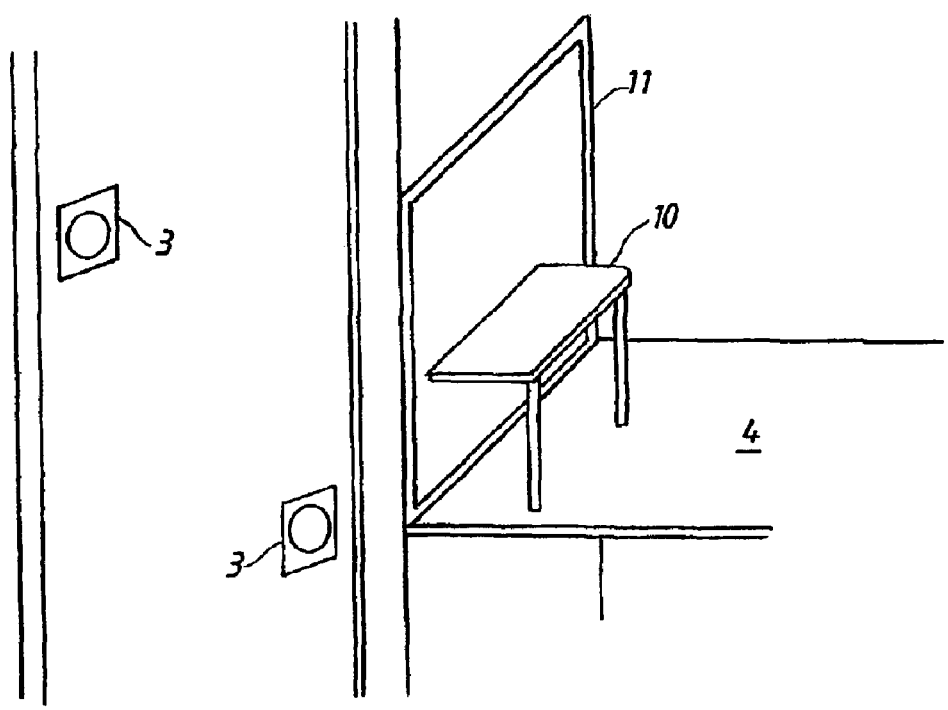
FIG. 3 shows an enlarged view of a shelf shown in FIG. 2 and used for separate identification of articles, and FIG. 4 schematically shows the principle of finding and identifying a hidden article.

A refrigerator 1 having one or several doors 2 is provided with one or several cameras 3. The number of cameras is chosen in dependence on the number of partial spaces in the refrigerator, i.e. the number of shelves 4 that are provided. The cameras are provided with wide angle lenses and are adapted to take digital colour pictures which are transferred to a local computer 5 connected to an image analyser 6, said transfer taking place via a fixed line or via radio link, for example by use of so-called bluetooth technique. Suitably, the computer 5 is equipped with a keyboard 7 and/or means for voice communication, and a monitor 8. The computer can also be connected to a central computer 9 via a fixed line, Internet or a radio link. Preferably, the central computer can be located at the company that provides the apparatus (white goods dealer or a company offering E-shopping). It should be mentioned that the local computer does not need to be a physically separate unit but could be part of the central computer.

In the central computer 9 all article identities are stored, if applicable recorded by means of bar codes or information stored on magnetic strips of RFID-type. Vegetables and fruit, for example, which appear unpacked in the store, are stored in the form of colour pictures as are articles without identifying characteristics as referred to above. All packed articles are supplementary registered as colour pictures for reasons given below.

In performing the method the following operations are applicable. Articles from the shop are put in the refrigerator 1 and the door 2 is closed. By means of a delay function the refrigerator light remains on during a minute or so and during that time pictures are taken by the cameras of the articles on all shelves.

In an apparatus having cameras 3 mounted in the door 2, alternatively, the cameras take one or several pictures at different angles during the turning movement of the door in the angular area from 90° to a position where the door is closed. On the monitor 8 the computer 5 can automatically show pictures of the articles put in the refrigerator, shelf by shelf or the user must effect this stepping of the pictures by means of the computer keyboard 7 or by means of voice control. As far as in the computer 5 pictures have been recorded for all articles put into the refrigerator 1 at this occasion nothing happens. However, in case the computer should not recognize certain articles these will be shown on the monitor 8, for example marked in a differing colour or stronger illuminated. In that case the user can connect the local computer 5 with the central computer 9 ans ask for the article identities. On the assumption that the central computer 9 can identify the articles their identities are transferred to the local computer 5 and recorded therein for future use, both as a picture and a denomination.

In case the central computer 9 does not recognize an article put into the refrigerator 1 this article will be shown on the monitor 8 with a surrounding frame or in another way clearly marked, for example in a list of articles. This is an invitation to the user to put the article concerned in an area specifically marked or on a particular shelf 10 provided in the refrigerator. Adjacent the shelf 10 one or several mirrors 11 are provided which reproduce also the back and bottom sides of the article in the pictures taken by the cameras 3. The article is depicted by at least two cameras 3. If the article is recognized by the local computer 3 or the central computer 9 when more than one projection thereof is available the user can press the ENTER-key 7 on the keyboard and registration in the local computer 5 is completed. In case none of the computers recognizes the article the user must enter the denomination of the article by means of the keyboard 7 or by means of voice control and the denomination is then recorded in the local computer together with pictures of the article.

Preferably, the shelf 10 is made of transparent material, such as clear glass. In refrigerators having glass shelves or bar shelves no particular shelf 10 is required but a marked area on a regular shelf can be used for the purpose indicated. In a freezer, however, having shelves formed by cooling elements as well as in cabinets for groceries with shelves made from solid wood or of fibre material a shelf 10 of transparent material is required. The reason for this is that one camera 3 depicts an article from above and another one from below through the shelf 10. Another advantage is that in the shelf 10 a load sensor can be provided which is connected to the two cameras taking pictures causing them to readjust focus so that sharp pictures are obtained of the new article. Advantageously, each shelf can be provided with a load sensor. These sensors and associated pictures of the shelf concerned can indicate if an additional article has been added or, in case of reduced weight and the image memory of the computer does not indicate any change of the number of articles or their identity, if in a package a certain quantity has been removed. If the computer can determine that any package has been disarranged the computer records that part of its content has been consumed.

In use of the method in a warehouse environment it is assumed that pallets or cardboard boxes or the like piled on pallets are marked by means of bar code labels. Each pallet position is equipped with a load sensor which upon a change (increase or decrease) of the load activates a camera, suitably situated on an opposite stand. The latest picture taken is stored in the computer and, accordingly, the computer can signal when the ordering point for the article concerned has been reached.

In the case of a post office the method is carried out in a similar way. Arriving parcels are placed in any free position in the available shelf compartments. Then, pictures are taken of the shelves by a sufficient number of cameras. The identities of the parcels are represented by bar code labels turned outwards. On the parcel dispatch note an identical bar code has been printed. Upon collection the latter bar code is read by a bar code reader connected to a local computer. The computer provides an indication of a shelf compartment making possible for the serving officer to find the parcel in question. If for some reason the parcel has arrived in the wrong collecting place, by means of the local computer a question can be directed to a central computer for the place of this parcel. In that way, by means of the local computer the parcel can be ordered from the erroneous collecting place.

In order to facilitate the supervision by the apparatus of for example the degree of freshness of food in a refrigerator a virtual system of coordinates is provided in the local computer. This means that the position of an article in the refrigerator is known by the computer 5. As regards packed food not completely consumed at one occasion but returned into the refrigerator for example after a meal, the computer can react in any of a few different ways. If the food is packed in a transparent vessel, e.g. sliced cucumber in a jar, the computer 5 can note that the volume of the food in the jar has decreased. In case of beverages packed in a non-transparent package (e.g. milk in carton pack) the computer assumes that a certain volume has been consumed. This is shown on the monitor 8 by giving the package a different colour or by indicating in the content list the number of times the package has left the refrigerator.

Due to the fact that changes of the content of the cabinet 1 can only take place when the cabinet door is open it is sufficient that pictures are taken by the cameras 3 every time the cabinet door is being closed. The latest pictures are compared to those taken immediately before and the computer 5 records the changes. In order to cover also the meal case when a milk package has been taken out from the refrigerator 1 before the meal, and after this withdrawal is considered as non-existent but after the meal is returned to the refrigerator, the computer 5 compares the two latest pictures with the to pictures taken immediately before. The computer program assumes that a certain volume of milk has been consumed at this occasion and if a shopping list is ordered from the computer, milk will be listed. If the milk package is returned within a determined time period, for example two hours can be programmed time, the computer records it as the same package. If a longer time has elapsed between the closure of the cabinet when the package was returned and the closure immediately before, the computer records the milk package as a new one. Then the computer records a new "best-before-date". It happens, of course, that a package is removed from the cabinet and then returned unopened. If the package is placed fairly on its initial place within the programmed "approved" out-of-refrigerator time nothing happens. However, if returned to a different place the package is marked on the monitor 8 or in the list in a differing colour. This means that the user has to confirm that it is the same package that previously has been taken from the refrigerator. In opposite case the computer will record it as a new package of the same article and give it a new "best-before-date".

Bearing in mind that not all shops get daily deliveries of perishables, such as milk, and in many shops the coordination between deliveries and sales of inter alia milk is imperfect one can not trust a programmed freshness time but in the computer a shorter time must be tied to the specific package. As a consequence, for safety reasons the user must himself be able to record the "best-before-date", which can take place in two ways. Either the package is placed on the shelf 10 and the camera 3 takes pictures of a date stamp on the package which is recorded in the computer 5. Alternatively, the user records the date of the stamp while the package on the shelf 10 is depicted by the camera 3. In the computer 5 time periods have been programmed for various food-stuffs indicating to which extent the freshness time has been shortened when these are at room temperature, such as during a meal or when being brought home from the shop.

The virtual system of coordinates of the computer 5 is helpful in keeping a check on specific articles, in particular those which are packed. When the milk package referred to above is returned to the same position from which is was taken no problem occurs. In the computer 5 a certain tolerance value can be programmed for the case that the package has been slightly displaced horizontally. Should the package be put into the refrigerator on a different shelf as compared to the shelf from which it was taken the computer notes that it is an opened package and records it together with the oldest "best-before-date" noted for milk packages in the refrigerator.

If the person loading articles into the refrigerator should put newly bought articles in front of remaining articles of the same kind the system of coordinates will help. If the older package remains unmoved or if it has been displaced further into the refrigerator it will be displayed on the monitor in a differing colour. Based on this information the user can rearrange the articles or he can take out the package with the innermost position next time this kind of article is to be used.

If articles are loaded in a cabinet in a closely packed arrangement and pictures have been taken by the cameras it may happen that the image analyser does not succeed in putting together pictures such that the computer 5 recognizes all articles. Even if the mirrors 11 complete the direct pictures taken by the cameras 3 of the sides of the packages facing the cameras and the system of coordinates of the computer 5 assigns the mirror images to the right packages the information to the image analyser could be insufficient for the computer 5 to recognize certain packages. Now, the unknown articles are shown lighter on the monitor whereby the user is requested to put one article at a time on the shelf 10 for identification. After, in this way, pictures have been taken of the articles they can be put back into the cabinet as known by the computer 5.

FIG. 4 shall illustrate how hidden articles, preferably packages, in a refrigerator are identified by the apparatus. As an assumption, the shelves of the refrigerator are essentially transparent, in practice meaning shelves made of glass or in bar shape. As a result, suitably placed cameras 3 can take pictures of the undersides/bottom surfaces of the packages A,B,C,D,E,F. Due to the fact that the position of the camera 3 which takes the pictures is known, the shelf with the package concerned will be identified. Hereby, the bottom pictures are paired together with the correct shelf overviews. The virtual system of coordinates serves to give orientation on where on the shelf the article is placed. By the aid thereof the apparatus then determines which package underside belongs to the unknown article. To the extent that the bottom side of the article is significative the article should now be identified as the whole bottom side has been depicted except for what is hidden by the bars in case of a bar shelf.

If there is no picture stored in the local computer 5 of the vertical sides of the article a request is sent to the central computer 9 which should be able to deliver this information.

The purpose of the pictures of FIG. 4 is to show how the identity of the article E is obtained. FIG. 4a shows schematically a refrigerator 1 with open door 2. Adjacent to its upper edge and close to its locking side a camera 3 is provided. During the closing phase of the door 2 the camera takes a picture showing the upper part of FIG. 4b. At the same time a camera 3', also disposed in the door 2 vertically below the camera 3, takes a picture. This picture is converted in the computer 5 into a orthogonal projection. As shown in the lower part of FIG. 4b the converted picture corresponds well with the picture of the upper part. Accordingly, here a picture is obtained of the bottom side of the package designated E which is hidden in the upper picture of FIG. 4b. If the bottom picture of the package E should be characteristic or if it can be recognized from the preceding opening the computer 5 or the central computer 9 can present a picture of the package/the article E as a whole. In case not an indication on the monitor 8 tells that on the shelf 4 there is an article which has to be placed on the shelf 10 in order to be registered in the memory of the computer 5.

In the situation shown in FIG. 4 it is, of course, an advantage if a mirror 11 is placed behind the shelf 4. Thereby a reflected image can be obtained of one vertical side of the package E. This picture is turned right in the image analyser 6 and used together with the picture taken by the camera 3' of the bottom side of the package E for the purpose of finding, for instance in the database of the central computer 9, the remaining sides of the package. Then, on the monitor 8 a picture can be displayed according to FIG. 4c or FIG. 4d.

The presentation of the content can follow the real arrangement in the refrigerator but it can also show groups of articles according to the date they were first identified or according to types of articles, e.g. vegetables, meat, beverage, etc. In the later case, by marking in the picture, information can be given about purchase time and last consumption date.

In case a medicine compartment is contained in a refrigerator or if a special medicine cabinet is provided it can be supervised by the apparatus. Then, by means of the computer clock, it is possible to control the display of packages of medicines which are to be taken at a certain time during the day so that they are marked in a differing colour. Moreover, the number of tablets to be administrated at each occasion can be shown above the reproduction of the respective package on the monitor. This method can be used to control that the medication is followed and, if not, to give a suitable alarm. In the cases discussed above the articles can of course also be presented as lists.

The apparatus can be used in connection with a plurality of similar methods as would be apparent to the man skilled in the art.

What is claimed is:

1. A method for recording the position and keeping a check on the storage time of articles stored in a room, a cabinet, a refrigerator, or other space, wherein one or several cameras are positioned in or adjacent to the space to photograph articles having been placed on shelves within the space, said cameras transferring pictures of the articles to a computer and associated image analyser, which on a monitor displays pictures put together or lists of the contents of the space, characterized in that after the entry of articles into the space, with the articles having a contact surface resting against the shelves, these articles are identified on pictures taken by the cameras in connection with a register programmed into the computer, said articles being registered with regard to orientation and position in the space and/or the time of entry, and that the identification of the articles is effected via depiction of the contact surface of the articles.

2. A method according to claim 1, characterized in that identification by the computer is based upon those articles present in the space at the preceding registration.

3. A method according to claim 1, characterized in that if an article placed in the space cannot be identified by the computer this article is displayed on the monitor in an overview picture in a differing colour or lighter than remaining articles.

4. A method according to claim 1, characterized in that the computer automatically gives to unidentified articles a unique identification which is registered together with the pictures.

5. A method according to claim 1, characterized in that if the computer cannot directly identify an article this article is placed on a marked place in the space to be depicted by at least one camera, the resulting picture or pictures being then registered in the computer.

6. A method according to claim 1, characterized in that if the article is not provided with a bar code it is depicted by one or several cameras of which at least one is directed towards one or several mirrors fixedly mounted in the space, whereby the sides of the article is registered in the computer.

7. A method according to claim 1, characterized in that inputting of articles or information thereof in the computer takes place by means of voice-controlled communication.

8. A method according to claim 1, characterized in that a virtual system of coordinates has been programmed into the computer making possible for correct back sides of the articles to be registered together with front sides of the articles visible to the cameras.

9. A method according to claim 8, characterized in that in a space, relatively closely packed with various articles so that the cameras can only transfer picture fragments to the computer, by means of the virtual system of coordinates the computer can keep a check on which articles are represented by the picture fragments.

10. A method according to claim 1, characterized in that when the freshness time of an article is about to expire the computer gives a signal on the monitor by showing on an overview picture the article in a framed shape or marked in a list.

11. Apparatus for recording the position of articles, said apparatus comprising a space (1) having at least one door (2), one or several cameras (3) for supervising the interior of the space (1), a local and/or a central computer (5) to which taken pictures are transferred by the cameras (3) in order for the pictures to be separated by an image analyser (6) connected to the computer (5) and the articles present on the pictures to be identified for registering in the computer (5), and a monitor (8) connected to the computer and on which pictures of the articles or a list can be displayed on command from a communication means (7) associated with the computer (5), characterized in that a virtual system of coordinates is provided in the computer (5) by means of which the orientation and place of each article is determined, means for registering the time of entry into the space and withdrawal from same of each article, and means for depiction of the contact surface, of the articles, against the shelf.

12. Apparatus according to claim 11, characterized in that in case the computer (5) cannot identify an article entered into the space the computer (5) can be connected to a central computer (9) which transfers the requested identity to the computer (5) to be added into the register thereof.

13. Apparatus according to claim 11, characterized in that if the information on an article contained in a picture transferred to the image analyser (6) from the camera (3) is insufficient for the computer (5) to be able to identify the article, the visible part of the article is shown in a differing colour in an overview picture presented on the monitor (8).

14. Apparatus according to claim 11, characterized in that in case an article is to be entered into the space which is not registered neither in the computer (5) nor the central computer (9) a shelf (10) of transparent material is provided towards which are directed at least two cameras (3) which by means of mirrors fixed mounted in the space depict the article from several sides, eventually including back sides, when the article is placed on the shelf (10).

15. Apparatus according to claim 11, characterized in that a thermal register for perishables is programmed into the computer (5) according to which the remaining "best-before-time" can be registered individually and adjusted in dependence on the time the article has been out of the temperature zone adapted for preserving freshness.

16. Apparatus according to claim 11, characterized in that at least one shelf is provided with one or several weight sensors.

17. An apparatus for recording the position of articles, comprising;

a cabinet with an interior accessed via a door;

shelves located in the cabinet interior, the shelves having a supporting surface to hold articles placed within the cabinet interior on the supporting surface, the articles having a contact surface which bears against the supporting surface of the shelves;

at least one camera located to photograph articles placed within the cabinet interior and produce digital images of the photographed articles, the digital images including a digital image of the contact surface of each article bearing against the supporting surface of the shelves;

a computer connected to receive the digital images from the camera;

an image analyser connected to the computer to analyze the digital images, including the digital image of the contact surface, to identify each photographed article for article identifications; and an article database storing the article identifications, wherein, placement of each of the articles within the interior is determined by the computer using an analysis of the contact surface of each article.

18. The apparatus of claim 17, wherein, the camera is programmed to photograph a new article placed within the cabinet interior at a set lapsed time after closing the cabinet door, the apparatus further comprising a light which remains illuminated during the lapsed time to illuminate the new article, during photographing, after the cabinet door has been closed.

19. The apparatus of claim 17, further comprising:

a load sensor mounted to detect a change in a number of articles on one shelf, the sensor being interfaced to the computer to update the article database upon the sensor detecting the change in the number of articles on the one shelf.

20. The apparatus of claim 17, wherein, the shelves are translucent to the camera, and the computer provides a display of the articles showing the articles as placed on the shelves.

\* \* \* \* \*